(12) United States Patent
Park

(10) Patent No.: US 6,361,927 B1
(45) Date of Patent: Mar. 26, 2002

(54) METHOD FOR FABRICATING GRATING PATTERN

(75) Inventor: Byung Sun Park, Yusong-Ku Daejeon (KR)

(73) Assignee: Havit Co., Ltd., Daejeon (KR)

( * ) Notice: Subject to any disclaimer, the term of this patent is extended or adjusted under 35 U.S.C. 154(b) by 0 days.

(21) Appl. No.: 09/461,175

(22) Filed: Dec. 14, 1999

(30) Foreign Application Priority Data

Dec. 15, 1998 (KR) ............................................. 98-55019

(51) Int. Cl.$^7$ ............................................. H01L 21/473
(52) U.S. Cl. ........................ 430/321; 430/320; 430/330; 65/17.5
(58) Field of Search .................. 430/320, 321, 430/330; 65/17.2

(56) References Cited

U.S. PATENT DOCUMENTS

| | | | | |
|---|---|---|---|---|
| 4,895,790 A | * | 1/1990 | Swanson et al. | 430/321 |
| 5,415,951 A | * | 5/1995 | Miyazaki | 430/321 |
| 5,452,053 A | * | 9/1995 | Nozue | 355/53 |
| 5,605,776 A | * | 2/1997 | Isao et al. | 430/5 |
| 5,627,104 A | * | 5/1997 | Bryant et al. | 438/631 |
| 5,633,120 A | * | 5/1997 | Vickers | 430/313 |
| 5,759,906 A | * | 6/1998 | Lou | 438/623 |
| 6,249,335 B1 | * | 6/2001 | Hirukawa et al. | 355/53 |

FOREIGN PATENT DOCUMENTS

| | | | |
|---|---|---|---|
| JP | 04-206820 | * | 7/1992 |
| JP | 07-153654 | * | 6/1995 |
| JP | 08-285851 | * | 11/1996 |

OTHER PUBLICATIONS

KR 9501841B (abstract only), Mar. 1995.*
Elliott, D.J., "Integrated Circuit Fabrication Technology", pp. 250–254 &260, 1982.*

* cited by examiner

*Primary Examiner*—Martin Angebranndt
(74) *Attorney, Agent, or Firm*—Dykema Gossett PLLC

(57) ABSTRACT

There is a provided a method for fabricating a grating pattern, including the steps of: coating an SOG solution on a glass substrate by spin coating method; heat-treating the SOG thin film coated on the glass substrate, to form a silicon oxide layer; coating a photoresist on the silicon oxide layer and exposing the photoresist layer by masking process; developing the exposed photoresist layer and wet-etching the silicon oxide layer; and developing the photoresist layer used as a mask. According to the present invention, the grating pattern can be fabricated without etching the glass substrate, and high-quality products at a low cost is accomplished since the present invention does not require the expensive sputtering apparatus. Furthermore, the step-shape oxide layer pattern can be obtained through one-time wet etching since the multilevel oxide layer is easily formed.

4 Claims, 4 Drawing Sheets

METHOD FOR FABRICATING GRATING PATTERN

BACKGROUND OF THE INVENTION

1. Field of the Invention

The present invention relates to a method for fabricating a grating pattern.

2. Discussion of Related Art

An optical pick-up unit is an element, which is constructed of a semiconductor laser, an object lens, an optical diode converting an optical signal into an electrical signal, and an actuator. This is also called an optical head as it becomes small. The optical head is divided into a separation type which generally names the optical pick-up unit including optical systems, a one-body type in which the object lens, actuator and optical elements are mounted on a single base, and a hologram laser in which a prism is replaced by a flat hologram (grating).

The optical pick-up unit is used in the appliances using optical disks such as CD-ROM player, optical magnetic disk, video CD, and MD, as well as the audio field like CD player. Furthermore, there is growing demand for the optical pick-up unit for DVD. Currently, optical pick-up elements become small, thin, light and high-speed.

FIGS. 1A, 1B, 1C and 1D are cross-sectional views showing a conventional method of fabricating a grating pattern. Referring to FIG. 1A, a silicon oxide layer 11 is deposited on a glass substrate 10 by sputtering process, photoresist is coated thereon by spin coating method and heat treatment is performed, to form a photoresist layer 12. Referring to FIG. 1B, exposure is carried out through a mask 13 in order to fabricate a grating pattern. Referring to FIG. 1C, exposed photoresist layer 12 is developed, and silicon oxide layer 11 is selectively etched by 15:1 buffered oxide etchant(BOE) using the photoresist layer as a mask. Referring to FIG. 1D, the photoresist used as the mask is developed to form silicon oxide layer pattern 11, thereby fabricating the grating pattern.

FIGS. 2A, 2B, 2C and 2D are cross-sectional views showing another conventional method of fabricating a grating pattern. Referring to FIG. 2A, photoresist is coated on the glass substrate 20 by spin coating method and heat treatment is performed, to form a photoresist layer 21. Referring to FIG. 2B, photoresist layer 21 is exposed through a mask 22 in order to form a grating pattern. Referring to FIG. 2C, exposed photoresist layer 21 is developed, and a silicon oxide layer 23 and 23' is deposited by sputtering process. Referring to FIG. 2D, photoresist is coated on the silicon oxide layer 23 and 23', silicon oxide layer 23' formed on the photoresist layer 21 is etched using 15:1 BOE by masking process, and the photoresist layer (not shown) which was coated on the silicon oxide layer 23 and used as the mask is developed to form silicon oxide layer pattern 23, thereby fabricating the grating pattern.

In the above-mentioned conventional methods of fabricating the grating pattern, however, the silicon oxide layer is not uniformly deposited over the entire glass substrate because it is formed by sputtering process. That is, its thickness at the center of the substrate is different from that at the peripheral region. Furthermore, the fabrication of the silicon oxide layer requires an expensive vacuum apparatus, deteriorating productivity.

SUMMARY OF THE INVENTION

An object of the present invention is to provide a method for fabricating a grating pattern in which SOG solution is coated on a glass substrate by spin-coating method and heat-treated to easily form a silicon oxide layer.

In order to achieve the above object of the present invention, the present invention provides a method for fabricating a grating pattern, including the steps of: coating an SOG solution on a glass substrate by spin coating method; heat-treating the SOG thin film coated on the glass substrate, to form a silicon oxide layer; coating a photoresist on the silicon oxide layer and exposing the photoresist layer by masking process; developing the exposed photoresist layer and wet-etching the silicon oxide layer; and developing the photoresist layer used as a mask.

The SOG thin film is heat-treated at a temperature of 80–170° C. The silicon oxide layer has a wet etch selectivity to the glass substrate of above 100:1, and its refractive index varies according to a gas atmosphere for the heat treatment. The silicon oxide layer is a multilevel silicon oxide layer, which is fabricated in such manner that the heat treatment is repeated at the temperature range of 80–170° C., carrying out from a high temperature to a low temperature (each heat treatment being conducted a lower temperature than the prior treatment). Also, the silicon oxide layer pattern is formed a step shape by one-time wet etching.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

DETAILED DESCRIPTION OF THE PREFERRED EMBODIMENT

Reference will now be made in detail to the preferred embodiments of the present invention, examples of which are illustrated in the accompanying drawings.

FIGS. 3A, 3B, 3C and 3D are cross-sectional views showing a method of fabricating a grating pattern according to an embodiment of the present invention. Referring to FIG.

3A, SOG solution is coated on a glass substrate 30 by spin coating method and heat treatment is performed, to form a silicon oxide layer 31. Here, the heat treatment is carried out at a temperature of 80–170° C. The etch rate of the silicon oxide layer depends on the temperature of heat treatment. In this case, a high etch selectivity to the glass substrate, 100:1 or more, can be obtained. Thereafter, photoresist is coated on silicon oxide layer 31 by spin coating method and heat treatment is carried out, to form a photoresist layer 32.

Figure 1A:
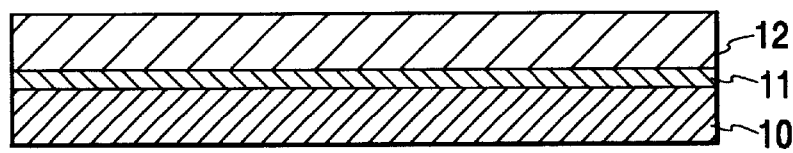
FIGS. 1A, 1B, 1C and 1D are cross-sectional views showing a conventional method of fabricating a grating pattern.
Figure 1B:
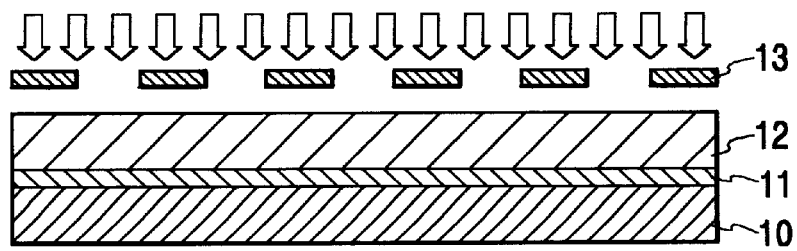
Figure 1C:
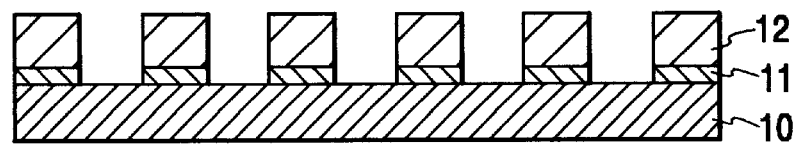
Figure 1D:
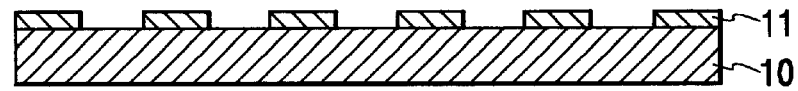
Figure 2A:
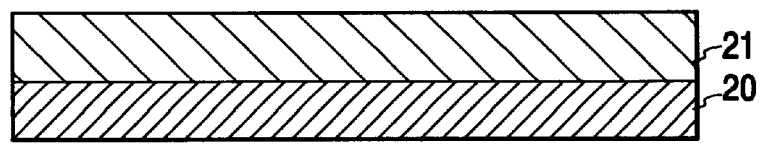
FIGS. 2A, 2B, 2C and 2D are cross-sectional views showing another conventional method of fabricating a grating pattern.
Figure 2B:
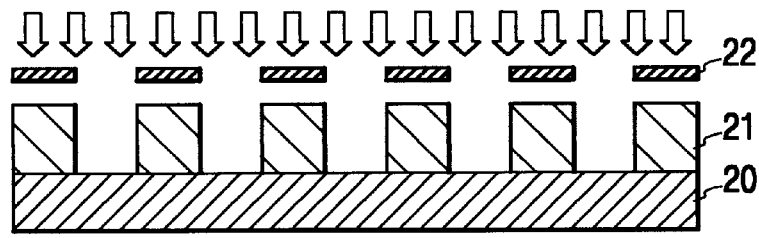
Figure 2C:
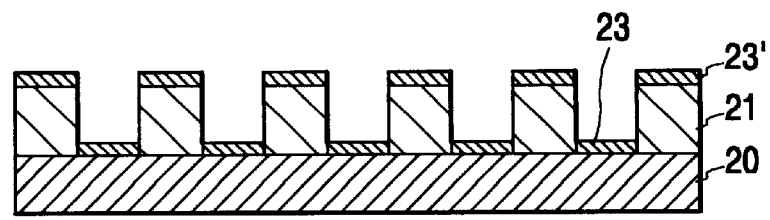
Figure 2D:
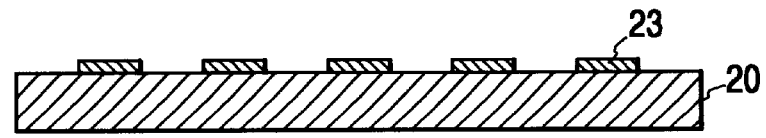
Figure 3A:
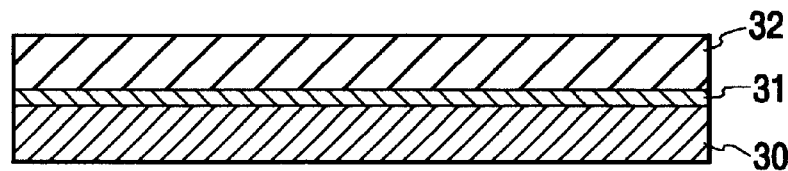
FIGS. 3A, 3B, 3C and 3D are cross-sectional views showing a method of fabricating a grating pattern according to an embodiment of the present invention.
Figure 3B:
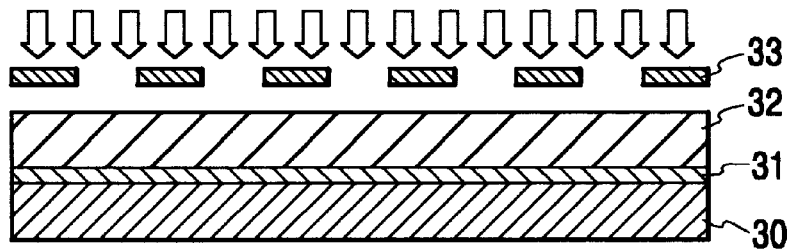
Figure 3C:
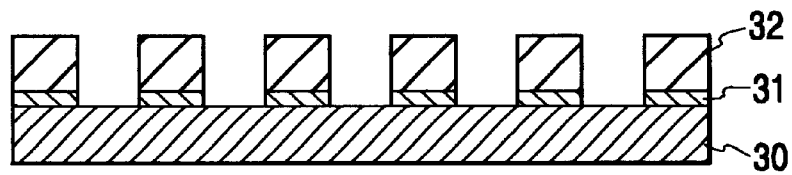
Figure 3D:
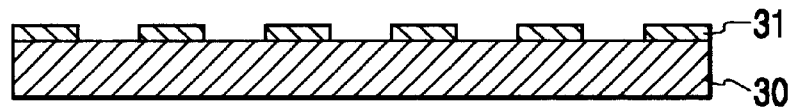

Referring to FIG. 3B, photoresist layer 32 is exposed through a mask 33 in order to form a grating pattern. Referring to FIG. 3C, exposed photoresist layer 32 is developed, and silicon oxide layer 31 is etched by 15:1 BOE using the photoresist layer as a mask. Referring to FIG. 3D, the photoresist layer that was used as the mask is developed to form silicon oxide layer pattern 31. Then, heat treatment is carried out at a temperature of 400–500° C. to obtain a strong silicon oxide crystal, thereby fabricating the grating pattern.

Another embodiment of the present invention is explained below with reference to the attached drawings. FIGS. 4A, 4B, 4C and 4D are cross-sectional views showing a method of fabricating a grating pattern according to another embodiment of the present invention.

Figure 4A:
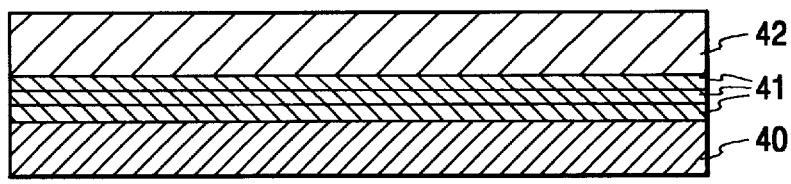
FIGS. 4A, 4B, 4C and 4D are cross-sectional views showing a method of fabricating a grating pattern according to another embodiment of the present invention.

Referring to FIG. 4A, SOG solution is coated on a glass substrate 40 by spin coating method and heat treatment is performed to form a three level silicon oxide layer 41. Three-level silicon oxide layer 41 is formed in such a manner that the process of SOG solution coating and heat treatment is repeated three times at a temperature of 80–170° C., carrying out from a high temperature to a low temperature (each heat treatment being conducted at a lower temperature than the prior heat treatment). Thereafter, photoresist is coated on silicon oxide layer 41 by spin coating method and heat treatment is carried out to form a photoresist layer 42.

Figure 4B:
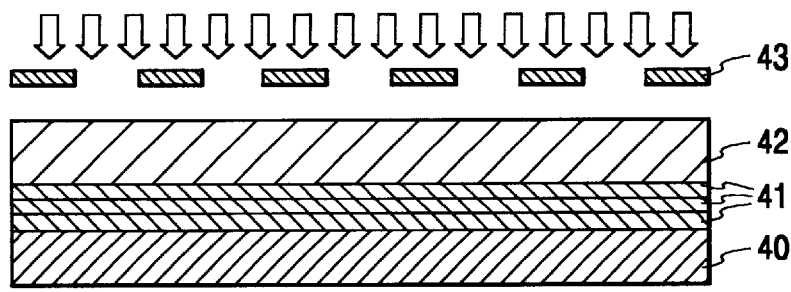
Figure 4C:
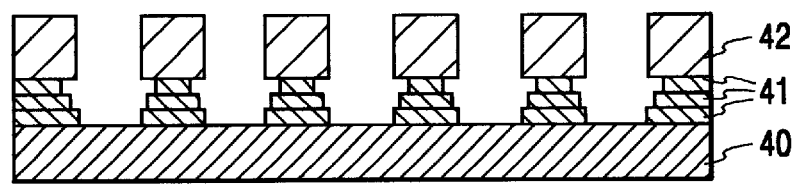
Figure 4D:
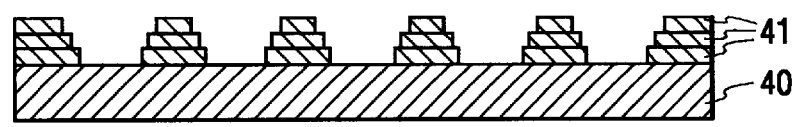

Referring to FIG. 4B, photoresist layer 42 is exposed through a mask 43 in order to form a grating pattern. Referring to FIG. 4C, the exposed photoresist layer 42 is developed, and silicon oxide layer 41 is etched by 15:1 BOE using the photoresist layer as a mask. Referring to FIG. 4D, the photoresist layer that was used as the mask is developed to form a step-shape silicon oxide layer pattern 41. Then, heat treatment is carried out at a temperature of 400–500° C. to obtain a strong silicon oxide crystal, thereby fabricating the grating pattern.

The present invention varies heat treatment conditions of the silicon oxide layer to obtain high etch selectivity to the glass substrate, and performs heat treatment at various gas atmospheres to easily change the refractive index of the silicon oxide layer. Furthermore, the present invention varies the heat treatment conditions to form the multilevel silicon oxide layer and fabricates the step-shape oxide layer pattern by one-time wet etching.

As described above, the method of fabricating a grating pattern according to the present invention coats the SOG layer by spin coating method to easily form the silicon oxide layer in a uniform thickness and secure reproductivity. Moreover, the present invention is able to fabricate high-quality products at a low cost since it does not require the expensive sputtering apparatus. Furthermore, the silicon oxide layer can be applied to the process of fabricating the grating pattern in various ways because its etch selectivity to the glass substrate and its refractive index are varied according to the heat treatment conditions. In addition, the step-shape oxide layer pattern can be obtained by one-time wet etching since the multilevel oxide layer is easily formed.

It will be apparent to those skilled in the art that various modifications and variations can be made in the method of fabricating a grating pattern of the present invention without departing from the spirit or scope of the invention. Thus, it is intended that the present invention covers the modifications and variations of this invention provided they come within the scope of the appended claims and their equivalents.

What is claimed is:

1. A method of fabricating a grating pattern, comprising the steps of:

coating a first SOG solution on a glass substrate by a spin coating method to form a first SOG thin film coated on the glass substrate;

heat-treating said first SOG thin film coated on said glass substrate at a first temperature of between 80 and 170° C. to form a first silicon oxide layer on said glass substrate;

coating a second SOG solution on the first silicon oxide layer by a spin coating method to form a second SOG thin film on the glass substrate;

heat-treating said second SOG thin film at a second temperature to form a second silicon oxide layer, said second temperature being lower than said first temperature and above 80° C.;

coating a third SOG solution on the second silicon oxide layer by a spin coating method to form a third SOG thin film on the glass substrate;

heat-treating said third SOG thin film at a third temperature to form a third silicon oxide layer, said third temperature being lower than said second temperature and above 70° C., thus forming a glass substrate with three silicon oxide layers thereon which have different etch rates;

coating a photoresist layer over said first, second and third silicon oxide layers and exposing said photoresist layer by a masking process;

developing said exposed photoresist layer and wet-etching said first, second and third silicon oxide layers once; and removing said photoresist layer to provide a glass substrate having a three-level stepped grating pattern thereon.

2. The method as claimed in claim 1, wherein said first, second and third silicon oxide layers have a wet etch selectivity to said glass substrate of above 100:1.

3. The method as claimed in claim 1, wherein the heat treatments are conducted in a gas atmosphere, and refractive index of said silicon oxide layer varies according to the gas atmosphere.

4. The method as claimed in claim 1, wherein said glass substrate with three-level stepped grating pattern thereon is further heat-treated at a temperature of 400–500° C.

* * * * *